US008761263B2

(12) United States Patent
Eleftheriadis

(10) Patent No.: US 8,761,263 B2
(45) Date of Patent: Jun. 24, 2014

(54) SYSTEM AND METHOD FOR MANAGEMENT OF SCALABILITY INFORMATION IN SCALABLE VIDEO AND AUDIO CODING SYSTEMS USING CONTROL MESSAGES

(75) Inventor: Alexandros Eleftheriadis, New York, NY (US)

(73) Assignee: Vidyo, Inc., Hackensack, NJ (US)

( * ) Notice: Subject to any disclaimer, the term of this patent is extended or adjusted under 35 U.S.C. 154(b) by 1361 days.

(21) Appl. No.: 11/691,621

(22) Filed: Mar. 27, 2007

(65) Prior Publication Data

US 2007/0291837 A1 Dec. 20, 2007

Related U.S. Application Data

(63) Continuation of application No. PCT/US2006/028365, filed on Jul. 21, 2006, and a continuation-in-part of application No. PCT/US2006/028366, filed on Jul. 21, 2006, and a continuation-in-part of application No. PCT/US2006/028367, filed on Jul. 21, 2006, and a continuation-in-part of application No. PCT/US2006/028368, filed on Jul. 21, 2006, and a continuation-in-part of application No. PCT/US2006/061815, filed on Dec. 8, 2006, and a continuation-in-part of application No. PCT/US2006/062569, filed on Dec. 22, 2006, and a continuation-in-part of application No. PCT/US2006/062357, filed on Dec. 20, 2006, and a continuation-in-part of application No. PCT/US2006/063335, filed on Mar. 5, 2007.

(60) Provisional application No. 60/786,178, filed on Mar. 27, 2006, provisional application No. 60/789,550, filed on Apr. 5, 2006, provisional application No. 60/884,148, filed on Jan. 9, 2007, provisional application No. 60/786,997, filed on Mar. 29, 2006.

(51) Int. Cl.
*H04N 7/12* (2006.01)
*H04N 7/167* (2011.01)

(52) U.S. Cl.
USPC .................................. 375/240.2; 380/201

(58) Field of Classification Search
CPC ............. H04I 29/06; H04N 19/00424; H04N 19/00442; H04N 19/00448; H04N 19/00533
USPC ............... 375/240.2, 240.26, 242.01, 242.02, 375/242.04, 242.05, 242.06, 242.08, 375/242.28; 370/389, 394
See application file for complete search history.

(56) References Cited

U.S. PATENT DOCUMENTS 6,205,140 B1 * 3/2001 Putzolu et al. ................. 370/389
6,459,812 B2 * 10/2002 Suzuki et al. .................. 382/232

(Continued)

FOREIGN PATENT DOCUMENTS

WO      WO 03/098475       11/2003

OTHER PUBLICATIONS

Eleftheriadis et al., "Management of SVC info using control ops", ITU Study Group 16—Video Coding Experts Group—ISO/IEC MPEG & ITU-T VCEG (ISO/IEC JTC1/SC29/WG11 and ITU-T SG16 Q6), Document No. JVT-S080, Apr. 7, 2006, XP030006459, *whole document*.

(Continued)

*Primary Examiner* — Farid Homayounmehr
*Assistant Examiner* — Abu Sholeman
(74) *Attorney, Agent, or Firm* — Baker Botts, LLP

(57) ABSTRACT

Systems and methods are provided for communicating timely information related to the scalability layer structure of signals received by decoders and other components in a video and/or audio communication system. For a communication system, which uses the Standard H.264 SVC coding format, standard SSEI messages are modified or supplemented to include the ability to signal scalability layer structure information and changes thereof. Recipients can use the signal scalability layer information to properly process or decode received signals.

66 Claims, 3 Drawing Sheets

(56) References Cited

U.S. PATENT DOCUMENTS

| | | | |
|---|---|---|---|
| 7,643,560 B2 * | 1/2010 | Hong et al. | 375/240.25 |
| 7,701,851 B2 * | 4/2010 | Chakareski et al. | 370/231 |
| 7,948,886 B2 * | 5/2011 | Chakareski et al. | 370/231 |
| 8,289,370 B2 * | 10/2012 | Civanlar et al. | 348/14.12 |
| 8,594,202 B2 * | 11/2013 | Eleftheriadis | 375/240.25 |
| 2004/0101052 A1 * | 5/2004 | Roh | 375/240.16 |
| 2004/0139212 A1 | 7/2004 | Mukherjee et al. | |
| 2005/0094726 A1 * | 5/2005 | Park | 375/240.08 |
| 2005/0254575 A1 * | 11/2005 | Hannuksela et al. | 375/240.1 |
| 2006/0013305 A1 | 1/2006 | Sun | |
| 2006/0256851 A1 * | 11/2006 | Wang et al. | 375/240.01 |
| 2007/0110150 A1 * | 5/2007 | Wang et al. | 375/240.1 |
| 2007/0116277 A1 * | 5/2007 | Ro et al. | 380/201 |
| 2007/0263087 A1 * | 11/2007 | Hong et al. | 348/14.13 |
| 2008/0101470 A1 * | 5/2008 | Hong et al. | 375/240.14 |
| 2008/0181228 A1 * | 7/2008 | Hannuksela et al. | 370/394 |
| 2009/0240714 A1 * | 9/2009 | Keith et al. | 707/100 |

OTHER PUBLICATIONS

"Joint scalable video model (JSVM) 6", ", ITU Study Group 16—Video Coding Experts Group—ISO/IEC MPEG & ITU-T VCEG (ISO/IEC JTC1/SC29/WG11 and ITU-T SG16 Q6), Document No. N8015, May 30, 3006, XP030014507, *paragraph [F.10]*.

JVT: "Joint Draft 4: Scalable video coding", ITU Study Group 16—Video Coding Experts Group—ISO/IEC MPEG & ITU-T VCEG (ISO/IEC JTC1/SC29/WG11 and ITU-T SG16 Q6), Document No. JVT-Q201d1, Oct. 16, 2005, XP030006254, *paragraph [F.10]*.

European Search Report dated Jul. 20, 2010 for EP application No. 07759451.3.

* cited by examiner

SYSTEM AND METHOD FOR MANAGEMENT OF SCALABILITY INFORMATION IN SCALABLE VIDEO AND AUDIO CODING SYSTEMS USING CONTROL MESSAGES

CROSS-REFERENCE TO RELATED APPLICATIONS

This application claims the benefit of U.S. provisional patent applications Ser. Nos. 60/786,178, filed Mar. 27, 2006, and 60/789,550, filed Apr. 5, 2006. Further, this application is related to and claims the benefit of International patent application Nos. PCT/US06/28365, PCT/US06/028366, PCT/US06/028367, PCT/US06/028368, PCT/US06/061815, PCT/US06/62569, PCT/US07/62357, and PCT/US07/63335, and U.S. provisional patent application Ser. Nos. 60/786,997 and 60/884,148. All of the aforementioned priority and related applications, which are commonly assigned, are hereby incorporated by reference herein in their entireties.

FIELD OF THE INVENTION

The present invention relates to video communication systems. In particular, the invention relates to techniques for communicating the structure of a scalable video coded bit stream, and changes thereto, in a video communication system in a way that reduces both the bit rate and the computational complexity.

BACKGROUND OF THE INVENTION

New digital video and audio "scalable" coding techniques, which are directed to general improvements in coding efficiency, have a number of new structural characteristics. Specifically, an important new characteristic is scalability. In scalable coding, an original or source signal is represented using two or more hierarchically structured bitstreams. The hierarchical structure implies that decoding of a given bitstream depends on the availability of some or all other bitstreams that are lower in hierarchy. Each bitstream, together with the bitstreams it depends on, offer a representation of the original signal at a particular temporal, fidelity (e.g., in terms of signal-to-noise ratio (SNR)), or spatial resolution (for video).

It is understood that term 'scalable' does not refer to magnitude or scale in terms of numbers, but rather to the ability of the encoding technique to offer a set of different bitstreams corresponding to efficient representations of the original or source signal at different 'scales' of resolutions or other qualities in general. The forthcoming ITU-T H.264 Annex F specification, which is referred to as Scalable Video Coding (SVC)), is an example of a video coding standard that offers video coding scalability in all of temporal, spatial, and fidelity dimensions. SVC is an extension of the H.264 standard (also known as Advanced Video Coding (AVC)). An example of an earlier standard, which also offered all three types of scalability, is ISO MPEG-2 (also published as ITU-T H.262). ITU G.729.1 (also known as G.729EV) is an example of a standard offering scalable audio coding.

Scalability was introduced in video and audio coding as a solution to distribution problems in streaming and broadcasting, and with a view to allow a given communication system to operate with varying access networks (e.g., clients connected with different bandwidths), network conditions (e.g., bandwidth fluctuation), and client devices (e.g., a personal computer that uses a large monitor vs. a handheld device with a much smaller screen).

Scalable video coding techniques, which are specifically designed for interactive video communication applications such as videoconferencing, are described in commonly assigned International patent application PCT/US06/028365. Further, commonly assigned International patent application PCT/US06/028365 describes the design of a new type of server, called Scalable Video Communication Server (SVCS). SVCS can advantageously use scalable coded video for high-quality and low-delay video communication and has a complexity, which is significantly reduced compared to traditional switching or transcoding Multipoint Control Units (MCUs). Similarly, commonly assigned International patent application PCT/US06/62569 describes a Compositing Scalable Video Coding Server (CSVCS), which has the same benefits as an SVCS but produces a single coded output bit stream. The scalable video coding design and the SVCS/CSVCS architecture can be used in further advantageous ways, which are described, for example, in commonly assigned International patent applications PCT/US06/028367, PCT/US06/027368, PCT/US06/061815, PCT/JUS07/62357, and PCT/US07/63335. These applications describe use of scalable coding techniques and SVCS/CVCS architecture for effective trunking between servers, reduced jitter buffer delay, error resilience and random access, "thinning" of scalable video bitstreams to improve coding efficiency with reduced packet loss, and rate control, respectively. Further, commonly assigned U.S. Provisional Patent Application Ser. No. 60/786,997 described techniques for transcoding between scalable video coding formats and other formats, whereas commonly assigned U.S. Provisional Patent Application Ser. No. 60/884,148 describes further improvements in error resilience in video communication systems that use scalable video coding.

Consideration is now being given to improved video and audio communication systems that use scalable video or audio coding. In particular, with a view of improving such systems, attention is directed toward managing the scalability information communicated from a source of a video or audio bit stream to a recipient, either directly or through one or more servers. The source may be a transmitting endpoint that encodes and transmits live video over a communication network, a streaming server that transmits pre-coded video, or a software module that provides access to a file stored in a mass storage or other access device. Similarly, the recipient may be a receiving endpoint that obtains the coded video or audio bit stream over a communication network, or directly from a mass storage or other access device.

SUMMARY OF THE INVENTION

Systems and methods are provided for improved management of scalability information in a video and audio communication system that uses scalable coding.

The systems and methods communicate the structure of a scalable coded bit stream, as well as changes that may occur over time, to system components. The communication techniques utilize differential encoding of the relevant information and advantageously achieve reduced bit rate overhead and reduced computational complexity.

In a preferred embodiment, for a video communication system which uses the Standard H.264 SVC coding format, the standard scalability information SEI messages are modified and also supplemented to include the ability to signal scalability information changes. The expanded set of scalability information SEI messages can inform recipients (e.g., servers, decoder/endpoints) of the scalability layer structure of transmitted signals and changes thereto. The recipients can use the scalability layer information to properly process or decode received signals.

BRIEF DESCRIPTION OF THE DRAWINGS

Further features, the nature, and various advantages of the invention will be more apparent from the following detailed description of the preferred embodiments and the accompanying drawings in which.

Figure 1:
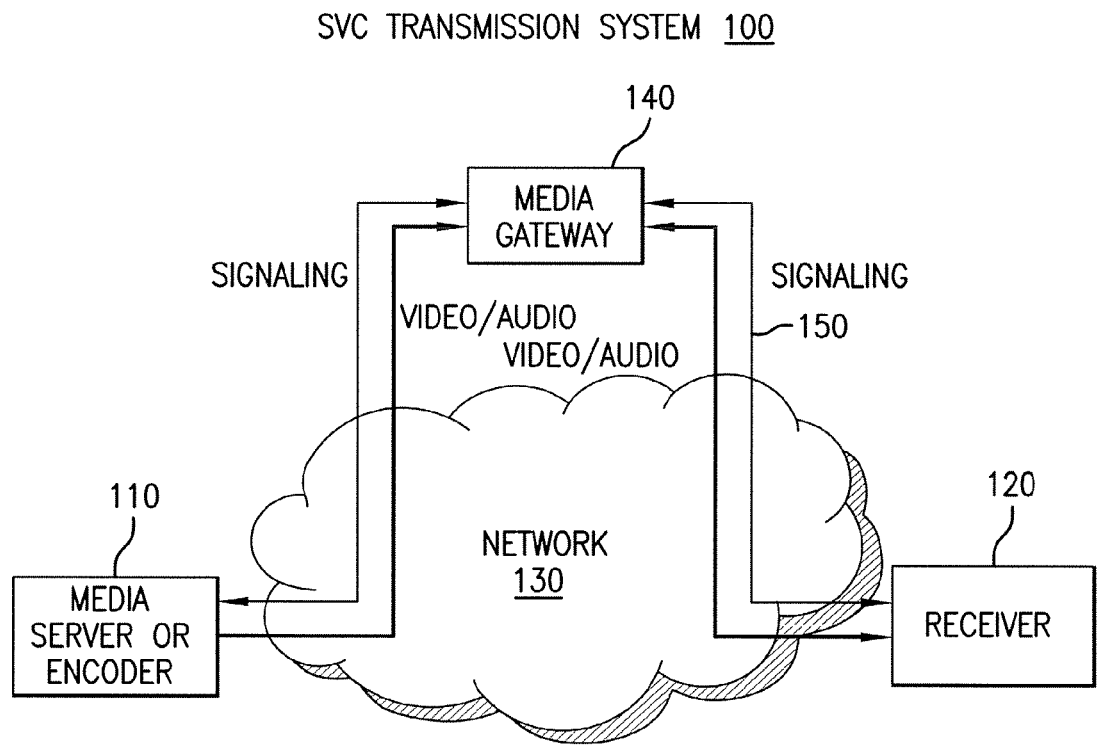
FIG. 1 is a block diagram illustrating an exemplary architecture of an SVC transmission system in accordance with the principles of the present invention.

Throughout the figures the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION OF THE INVENTION

Systems and methods are provided for improved management of scalability information in a video and audio communication system that uses scalable coding.

FIG. 1 shows an exemplary architecture of a communication system 100 which uses scalable coding. Communication system 100 includes a media server or encoder 110 (e.g., a streaming server or a transmitting endpoint), which communicates video and/or audio signals with a client/receiver 120 over a network 130 through a media gateway 140.

For brevity, the description herein is limited to the video portion of such a communication system. It will be understood, however, that systems and methods described herein for the video portion can be used for the scalable audio portions, with the understanding that no spatial scalability dimension can be provided to an audio signal, but multi-channel coding may additionally be used in audio signal coding. Further the systems and methods describe herein also can be used for other multimedia data (e.g., graphics) which is coded in a scalable fashion.

In a preferred embodiment of communication system 100, the H.264 SVC coding format ('SVC') is used for video communication. (See, e.g., the SVC JD5 specification, T. Wiegand, G. Sullivan, J. Reichel, H. Schwarz, M. Wien, eds., "Joint Draft 5: Scalable Video Coding," Joint Video Team, Doc. JVT-R201, Bangkok, Thailand, January 2005, which is incorporated by reference herein in its entirety). SVC is the scalable video coding extension (Annex F) of the H.264 AVC video coding standard.

SVC offers considerable flexibility in creating bitstream structures with scalability in several dimensions (e.g. spatial, temporal, fidelity or quality dimensions). An SVC coded bitstream can be structured into several components or layers. A base layer offers a representation of the source signal at some basic fidelity. Additional layers (enhancement layers) provide information for improved representation of the signal in the additional scalability dimensions above the basic fidelity dimension. It is noted that the layers on the coded bitstream are typically formed in a pyramidal structure, in which the decoding of a layer may require the presence of one or more lower layers. Typically, the availability of the base layer is required for decoding of any of the enhancement layers. The pyramidal structure of the layers is not necessarily always the case. For example, when scalability is provided through multiple description coding or simulcasting, independent decoding of some or all layers may be possible. The systems and methods described herein are applicable to all of these scalability formats.

Scalability can address several system-level challenges, such as heterogenous networks and/or clients, time-varying network performance, best-effort network delivery, etc. In order to be able to effectively use these features, however, it is imperative that they are made accessible to system components beyond the video encoder and decoder.

The systems and methods of the present invention, which effectively use all scalability features, are understood with reference to FIG. 1. First, it is noted that use of a media gateway 140 in system 100 is optional. The systems and methods of the present invention are the same or similar, when a direct media server to client connection is used, or when the media server is replaced by a file that is directly accessible to the client on a mass storage or other access device, either directly or indirectly (e.g., a file access through a communication network).

Consider a simple operational scenario in which media server/encoder 110 (e.g., a streaming server or encoder a transmitting endpoint encoder) communicates scalable media with client/receiver 120 through media gateway 140. This simple scenario requires that a connection be made between the media server and the client for transmitting an agreed-upon set of layers, which may, for example, be RTP-encapsulated SVC NAL units. Furthermore, media gateway 140 has to be instructed (or infer on its own) how to best operationally utilize the incoming packets (e.g., the transmitted RTP-encapsulated SVC NAL units). In the case where media gateway 140 has the SVCS/CSVCS architecture, this operational decision corresponds to deciding which packets to drop and which to forward. Further, for proper decoder operation, client/receiver 120 must know or be able to deduce which set of layers it is supposed to receive.

To enable these functionalities, system 100 must represent and communicate the scalability structure of the transmitted bit stream to the various system components. As an illustrative example, consider a video signal with two temporal resolutions, 15 and 30 fps, and two spatial resolutions, QCIF and CIF. This corresponds to a four-layer scalability structure: layer L0 containing the QCIF signal at 15 fps; layer L1 containing the QCIF signal enhancement for 30 fps; layer S0 containing the CIF signal enhancement for 15 fps; and layer S1 containing the CIF signal enhancement for 30 fps. The coding dependency in the four-layer scalability structure could be such that L0 is the base layer, L1 depends on L0, S0 depends on L0, and S1 depends on both L1 and S0. System 100 must describe this four-layer structure to the system components so that they can properly process the video signal.

SVC offers a mechanism for describing the scalability structure of an SVC coded video bitstream through its Scalability Information SEI message (SSEI). Supplemental Enhancement Information (SEI) messages, are data structures contained in an SVC bitstream that provide ancillary information about the coded video signal but are not necessary for the operation of the decoding process. The SSEI, defined in Section F.10.1.1 of the SVC JD5 specification, includes descriptive information about each layer (e.g., frame rate, profile information), and significantly, coding dependency information, i.e., which other layers a given layer depends on for proper decoding. Each layer is identified, within the scope of the bitstream, by a unique 'layer id'. The coding dependency information for a particular layer is communicated by encoding the number of directly dependent layers (num_directly_dependent_layers), and a series of difference values (directly_dependent_layer_id_delta), which when added to the particular layer's layer id identify the layer id's of the layers that the particular layer depends on for decoding.

The SSEI as defined in Section F.10.1.1 of the SVC JD5 specification was designed in order to enable capability negotiation (e.g., during a connection setup), stream adaptation (by video server or intermediate media gateways), and low-complexity processing (e.g., without inference based on detailed bitstream parsing). The SSEI JD5 design, however, has several limitations, which become apparent upon close examination of the way the SSEI message information has to be used in a communication system.

In the operation of a communication system (e.g., system 100), there can be several instances where the structure of the transmitted stream is established or modified (either at the server/source or the media gateway):

Initial definition during capability negotiation. The media server offers a set of scalability layers, and the client accepts all or a subset of them, either directly, or via a negotiation process (e.g., using Session Description Protocol (SDP)).

Modification of the layering structure by the media server or media gateway to accommodate changing system conditions (e.g., increased packet losses between media gateway and client or change of desired display resolution at the client).

Modification of the layering structure due to encoder decisions. An example of such an encoder decision relates to Fine Granularity Scalability (FGS), a mechanism for providing fidelity scalability where a fraction of the FGS layer bitstream can be used to produce a signal at a reduced quality. As a result of the way FGS is designed in SVC JD5, it is possible for the layer dependency to change from one picture to the next (or in fact, from one slice to the next). Specifically, consider the case where a prediction is performed at a given layer using as a reference a lower layer that uses FGS, and the prediction is based on only a fraction of that layer. In this case, it is possible that different pictures of the same layer may depend on different lower layers, as some layers could be completely eliminated due to rate control. A possible solution, which would not change the layer dependency structure, is to use an empty NAL unit. However, this is not allowed in SVC JD5. This case may be viewed as being similar to the immediately preceding one, with the difference that the time scale in which the change in layer dependency occurs is extremely high (per-slice).

Capability negotiation is a communication system feature that is outside the scope of the SVC specification, and scalable coding in general. Related communication application domains, such as IP telephony, have developed extensive procedures for capability negotiation. For example, Session Initiation Protocol (SIP)-based communication systems use SDP-based offer/answer. It is noted that use of the SSEI for this capability negotiation functionality alone is superfluous. In accordance with the present invention, the SSEI should not merely indicate what the encoder is capable of producing, but preferably should indicate what is (or will be) actually contained in the transmitted bitstream. In this respect, the SSEI, according to the present invention, is modified to define the overall scalability information structure for the bitstream, which is assumed to be in effect unless communicated otherwise.

Modification of the layering structure (i.e., stream adaptation) can occur in the operation of a communication system at either the media server/encoder or intermediate media gateways (more than one such media gateway may be present). An example of stream adaptation is the case where client/receiver 120 decides to switch or change resolution (e.g., from CIF to QCIF). The switch or change in resolutions is effected by dropping the corresponding packets either at media gateway 140 or at transmitting media server 110. Triggering of the change of resolution is accomplished using traditional signaling (shown as signaling paths 150 in FIG. 1). An important consideration for proper switching operation is when client/receiver 120 can be signaled that the requested change has taken place. In the absence of any such signaled information, client/receiver 120 will, at some point, receive only a subset of the total packets or bits (those corresponding to the QCIF resolution). It cannot know, however, if the loss of the high resolution packets or bits is intentional (the result of its request) or due to packet or bit losses. Considerations related to single-loop decoding may exacerbate the problem, since a lower layer picture may not be available at client/receiver 120 to be displayed in the absence of target layer data.

As previously noted such switching information can be provided by signaling messages from the media server or media gateway to client/receiver 120 in a traditional manner (e.g., via signaling paths 150). However, the present invention recognizes that there are considerable benefits (e.g., in terms of synchronization and response time to error conditions) if the layering structure information is carried inband with the coded data. The layering structure information (an changes thereto) may be carried inband in modified SSEI messages.

Another example of stream adaption due to changing system conditions, relates to adaptation to network-induced packet losses. In such case, the media gateway can decide to change or reduce, for example, the bandwidth of the transmitted stream using quality scalability features. Again for proper operation, client/receiver 120 must be timely informed or instructed about the change in the to-be-received bitstream. The changing layering structure information can be timely carried in modified SSEI messages inband with the coded data.

Similar to the cases of stream adaptation, are the cases of encoder-driven layer structure changes. In contrast to the cases of stream adaptation discussed above, the encoder-driven layer structure changes are not initiated by the client or the media server in response to system parameter changes, but instead are an "artefact" of the encoding process used by a video encoder. Like the signal adaptation cases, the information about the changes to layering structure can be timely signaled via modified SSEI messages inband with the coded data for proper synchronization with the media gateway and decoder.

Consideration of the operation of system 100 in foregoing cases shows that there is a need for providing scalability information messages at various points in the course of a communication session, and at time scales (or frequencies) that may be as high as the slice level.

It is noted that providing scalability information messages (e.g., via modified SSEI messages) can be practical only if the overhead in using the messages is made extremely small. Further, since the number of clients supported by a given server or gateway is often maximized for economy in a communication system, it is obviously desirable to minimize the computational burden in the communication system in parsing as well as generating the relevant messages.

It is noted that the SVC JD5 specification mandates the use of SSEI only at an instantaneous decoding refresh (IDR) access unit (Section F.10.2.1). IDR access units are equivalent to intra pictures, which have considerable bit rate overhead, and are often used only once in interactive video communication systems (for the encoding of the very first picture). This limitation further prohibits use of the standard SSEI to signal scalability information changes.

Since one of the primary uses of the SSEI is to assist servers and media gateways in the proper handling of SVC streams, it is advantageous if the processing complexity of such messages is minimized. This is typically accomplished using fixed-length fields and as few options as possible. This simplicity contradicts the need for efficient compression, in order to minimize the bit rate overhead associated with SSEI messages. Coding efficiency is particularly important if the granularity of SSEI message transmission is very high (which as noted above, could be at the slice level).

Proposals have been made for more efficient representation, of the SSEI information from a compression point of view. (See, e.g., I. Amonou, N. Cammas, S. Kervadec, and S. Pateux, "Improved Signaling of Scalability Information," Joint Video Team, Doc. JVT-R068, Nice, Bangkok, January 2006, which is incorporated by reference herein in its entirety). However, the proposed representations have considerable computational complexity. For example, the aforementioned Doc. JVT-R068 proposes a representation, which shows a reduction of about 50% in overhead, when using a large number of scalability layers. The proposed representation is based on a tree-structured approach in coding of the different layers, where each node level corresponds to one of the three scalability dimensions (spatial, temporal, and quality, in that order). Presentation points correspond to the leaves of the tree. In contrast, the SVC JD5 syntax is based on a sequential parsing of the presentation points, coded in arbitrary order. This is similar to parsing of the leaves only of the tree structure of mentioned in Doc. JVT-R068, with the noted drawback that some information is unnecessarily duplicated from one layer to the next. In the tree-based approach, it is not necessary for leaves with a common ancestor to duplicate the information represented by their common parent(s). The unnecessary duplication, however, can be avoided by an alternative coding approach that employs judicious use of option flags when creating the SSEI. For example, when only the temporal_level changes from one layer to the next, it is practical to directly infer that the frame sizes in both layers are the same and thus the frame size needs to be provided only once (e.g., at the lowest layer).

With both of the aforementioned approaches (i.e., Doc. JVT-R068 and SVC JD5 syntax with the alternate interpretation of coding of option flags) it is noted that the "computation-compression" tradeoff is not ideal. In contrast to these approaches, the present invention employs a technique based on differential coding of the layer dependency information, so that layers can be added, replaced, or removed at will. In contrast to the aforementioned approaches, the inventive technique simultaneously reduces the bit rate overhead and computational complexity to minimal levels.

The inventive technique for conveying necessary SSEI information can be understood with reference to its application to an example in which it is assumed that an initial SSEI is obtained and maintained as state information at the server, gateway, or client in the communication system. The needed bits to remove a layer or a subset of layers from the SSEI state can be very small, as one needs to only transmit enough "differential" information to identify the layer at which the SSEI information structure will be truncated. In other words, the indicated layer as well as all layers dependent on it can be eliminated from the state information upon identification of the layer. Similarly, in order to add a new layer or a new set of layers to the SSEI state, it is sufficient to transmit only the differential information pertaining to the layer(s) to be added. By design, this approach eliminates all overhead related to duplicate coding of layering structure information from one SSEI instance to the next.

The reduction of the total bit rate associated with coding of SSEI information due to such differential encoding allows the use of simple coding structures for the required messages, so that their parsing by media unaware (at least at the video coding level or VLC in H.264 terminology) gateways is simplified. It is noted that the technique does make any assumptions about how these SSEI messages will be transported or—more importantly—if and how they are transported reliably. It is sufficient to merely ensure state consistency if the same message is received more than once.

The SSEI messages may be supplemented with the layer structure information in any suitable manner. Two embodiments (embodiments A and B) are described herein. In embodiment A, the SSEI is supplemented by three additional scalability information control SEI messages, corresponding to the operations of adding, replacing, or removing one or more layers. These operations are applied cumulatively; in other words, the input state assumed upon applying the indicated operation is the one in effect at the time just before the operation. In the alternative embodiment (embodiment B), the SSEI information is supplemented by two additional scalability information control SEI messages indicating which layers are not present, and which layers have changed decoding dependency information, respectively. In contrast to the cumulative operations of embodiment A, the operations in embodiment B are not applied in a cumulative manner, but instead assume that the input state for applying the indicated operation is the one established by the most recent SSEI message. Embodiment B may be preferred in environments where the SEI messages may be subject to losses. In this case, the initial SSEI can be communicated to the receiver or media gateway during session setup using reliable transport mechanisms. Loss of any intervening scalability information control messages in embodiment B will not affect the receiver or media gateway's state information embodiment B as it would in Embodiment A.

Embodiment A of the present invention introduces three new SEI payload types in Annex D of SVC JD5 (Section D.1):

scalability_info_add (payload type 26), which adds one or more layers to an existing SSEI information structure;

scalability_info_replace (payload type 27), which replaces one or more layers of an existing SSEI information structure; and scalability_info_delete (payload type 28) which deletes one or more layers from an existing SSEI information structure.

The syntax for the 'add' and 'replace' versions is identical to that of the basic scalability_info (SSEI) structure. Only the semantics of the contained data are changed, and only in terms of how SSEI state management is performed (in other words, individual field interpretations remain the same). The syntax for the 'delete' version can be simple as it only needs to identify the layer id's of the layers to be removed. It is noted that the 'replace' version is mostly useful to handle changes in the layer dependency information. Since no other information needs to be coded, the size of such a message can be made extremely small (e.g. in the order of 30-40 bits, depending on the number of layers).

In the following, the use of the term "SSEI information" refers to any of these four types of scalability information, unless explicitly indicated otherwise.

As the current SVC JD5 specification mandates the use of SSEI only at an IDR access unit (Section F.10.2.1), SSEI information in the present invention is allowed to occur at the beginning of any access unit.

When the SPS (Sequence Parameter Set in SVC) parameter nal_extension_flag is set to 0, the dependency_id, temporal_level, and quality_level values (referred to herein as DTQ values) for all layers are defined in the SPS (Section F.7.3.2). Association of a given NAL unit to these values is performed using the simple_priority_id, if the NAL syntax element extension_flag is 0. If extension_flag is 1, then simple_priority_id is ignored according to the current specification, and the NAL header values for the DTQ parameters are used. Note that when profile_idc is not equal to 83, then all NAL units of type 20 and 21 have to have their extension_flag set (Section F.7.4.2).

If we assume that at the SPS level nal_extension_flag is set to 0, then all SVC NAL headers will only employ the simple_priority_id rather than the full DTQ set. In order to allow a server or gateway to process the NAL stream, both messages have to be parsed. The SSEI provides the detailed layering information, whereas the SPS maps particular layers to priority id values. There appear to be no compelling reasons to include this information at the SPS, and there may in fact be several reasons not to do so. Upon examination of the rest of the information contained in the SPS, it is noted that none relates to transport issues. Accordingly, under the present invention, the relevant portion of the SPS can be removed and its coding moved instead to the SSEI.

The use of nal_extension_flag should preferably be stream-wide, in other words the coexistence of NALs with, and without, the extended NAL header should not be allowed. Although in theory enabling such capability may appear to offer more flexibility, in practice such capability complicates the operation of servers and gateways without real tangible benefits. As a result, coding of the nal_extension_flag under the present invention is not done per-layer, but per SSEI. This is in agreement with the SVC JD5 where coding is done on a per-SPS basis.

With the simple_prority_id encoding done at the SSEI level, it is no longer necessary to have the encoding of DTQ values be optional, and as a result the corresponding flag (decoding_dependency_info_present_flag) of the SSEI can be removed.

It has been previously noted that SVC is the scalable video coding extension (Annex F) of the H.264 AVC video coding standard. An AVC-compatible layer implies use of NAL unit headers without either the simple_priority_id or DTQ field extensions. According to the SVC JD5 specification, the values are assumed to be 0. In the present invention the values of the simple_priority_id or DTQ field extensions are signaled at the SSEI level.

TABLE I shows exemplary syntax changes that are made to Section F.7.3.2, Sequence Parameter set SVC extension syntax, of the SVC JD5 specification in accordance with the principles of the present invention. The changes consist of removal of the syntax elements related to priority id and DTQ.

TABLE I

SPS SVC EXTENSION MODIFICATIONS

| seq_parameter_set_svc_extension( ) { | C | Descriptor |
|---|---|---|
| ~~nal_unit_extension_flag~~ | ~~0~~ | ~~u(1)~~ |
| ~~If(nal_unit_extension_flag == 0) {~~ | | |
| ~~number_of_simple_priority_id_values_minus1~~ | ~~0~~ | ~~ue(v)~~ |
| ~~for(i = 0; i <= number_of_simple_priority_id_values_minus1; i++) {~~ | | |
| ~~priority_id~~ | ~~0~~ | ~~u(6)~~ |
| ~~temporal_level_list[priority_id]~~ | ~~0~~ | ~~u(3)~~ |
| ~~dependency_id_list[priority_id]~~ | ~~0~~ | ~~u(3)~~ |
| ~~quality_level_list[priority_id]~~ | ~~0~~ | ~~u(2)~~ |
| ~~}~~ | | |
| ~~}~~ | | |
| extended_spatial_scalability | 0 | u(2) |
| If( extended_spatial_scalability > 0 ) { | | |
|   if ( chroma_format_idc > 0 ) { | | |
|     chroma_phase_x_plus1 | 0 | u(2) |
|     chroma_phase_y_plus1 | 0 | u(2) |
|   } | | |
|   if( extended_spatial_scalability == 1 ) { | | |
|     scaled_base_left_offset | 0 | se(v) |
|     scaled_base_top_offset | 0 | se(v) |
|     scaled_base_right_offset | 0 | se(v) |
|     scaled_base_bottom_offset | 0 | se(v) |
|   } | | |
| } | | |
| } | | |

TABLE II shows exemplary syntax changes (additions) that are made in Annex D, D.1, SEI payload type syntax, in accordance with the principles of the present invention. Three new payload types are added (26-28) corresponding to the add, replace, and delete operations.

TABLE II

SEI PAYLOAD TYPES

| sei_payload( payloadType, payloadSize ) { | C | Descriptor |
|---|---|---|
| if( payloadType == 0 ) | | |
|   Buffering_period( payloadSize ) | 5 | |
| else if( payloadType == 1 ) | | |

TABLE II-continued

SEI PAYLOAD TYPES

```
sei_payload( payloadType, payloadSize ) {                          C    Descriptor
    pic_timing( payloadSize )
                    etc.
    else if( payloadType = = 22 )
        scalabilty_info( payloadSize ) /* specified in             5
            Annex F */
                    etc.
    else if (payloadType == 26)
        scalability_info_add(payloadSize) /*                       5
            specified in Annex F */
    else if (payloadType == 27)
        scalability_info_replace(payloadSize) /*                   5
            specified in Annex F */
    else if (payloadType == 28)
        scalability_info_delete(payloadSize) /*                    5
            specified in Annex F */
    else
        reserved_sei_message( payloadSize )                        5
    if( !byte_aligned( ) ) {
        bit_equal_to_one /* equal to 1 */                          5    f(1)
        while( !byte_aligned( ) )
            bit_equal_to_zero /* equal to 0 */                     5    f(1)
    }
}
```

TABLE III shows exemplary syntax changes that are made in Section F.10.1.1, Scalability information SEI message syntax, in accordance with the principles of the present invention. We note the introduction of the nal_unit_extension_flag (moved from the SPS), and the introduction of the avc_compatible_flag. Further, we note that DTQ encoding is always present for non-AVC layers, and that priority_id to DTQ association is established if the nal_unit_extension_flag is not set (i.e., when NAL units do not carry explicit DTQ information).

TABLE III

SCALABILITY INFORMATION SEI MESSAGE SYNTAX

```
scalability_info( payloadSize ) {                                  C    Descriptor
    num_layers_minus1                                              5    ue(v)
    nal_unit_extension_flag                                        5    u(1)
    for( i = 0; i <= num_layers_minus1; i++ ) {
        layer_id[ i ]                                              5    u(8)
        avc_compatible_flag[ i ]                                   5    u(1)
        fgs_layer_flag[ i ]                                        5    u(1)
        sub_pic_layer_flag[ i ]                                    5    u(1)
        sub_region_layer_flag[ i ]                                 5    u(1)
        profile_level_info_present_flag[ i ]                       5    u(1)
        decoding_dependency_info_present_flag[i]                   5    u(1)
        bitrate_info_present_flag[ i ]                             5    u(1)
        frm_rate_info_present_flag[ i ]                            5    u(1)
        frm_size_info_present_flag[ i ]                            5    u(1)
        if (! avc_compatible_flag[ i ]) {
            layer_dependency_info_present_flag[ i ]                5    u(1)
        }
        init_parameter_sets_info_present_flag[ i ]                 5    u(1)
        if (profile_level_info_present_flag[ i ]) {
            layer_profile_idc[ i ]                                 5    u(8)
            layer_constraint_set0_flag[ i ]                        5    u(1)
            layer_constraint_set1_flag[ i ]                        5    u(1)
            layer_constraint_set2_flag[ i ]                        5    u(1)
            layer_constraint_set3_flag[ i ]                        5    u(1)
            reserved_zero_4bits /* equal to 0 */                   5    u(4)
            layer_level_idc[ i ]                                   5    u(8)
        }
        if(decoding_dependency_info_present_flag[i]) {
        if(! avc_compatible_flag[ i ]) {
            if (! nal_unit_extension_flag) {
                priority_id[ i ]                                   5    u(6)
```

TABLE III-continued

SCALABILITY INFORMATION SEI MESSAGE SYNTAX

```
scalability_info( payloadSize ) {                                  C    Descriptor
        }
        temporal_level[ i ]                                        5    u(3)
        dependency_id[ i ]                                         5    u(3)
        quality_level[ i ]                                         5    u(2)
    }
    if( bitrate_info_present_flag[ i ] ) {
        avg_bitrate[ i ]                                           5    u(16)
        max_bitrate[ i ]                                           5    u(16)
    }
    if( frm_rate_info_present_flag[ i ] ) {
        constant_frm_rate_idc[ i ]                                 5    u(2)
        avg_frm_rate[ i ]                                          5    u(16)
    }
    if( frm_size_info_present_flag[ i ] ) {
        frm_width_in_mbs_minus1[ i ]                               5    ue(v)
        frm_height_in_mbs_minus1[ i ]                              5    ue(v)
    }
    if( sub_region_layer_flag[ i ] ) {
        base_region_layer_id[ i ]                                  5    u(8)
        dynamic_rect_flag[ i ]                                     5    u(1)
        if( dynamic_rect_flag[ i ] ) {
            horizontal_offset[ i ]                                 5    u(16)
            verticial_offset[ i ]                                  5    u(16)
            region_width[ i ]                                      5    u(16)
            region_height[ i ]                                     5    u(16)
        }
    }
    if( sub_pic_layer_flag[ i ] )
        roi_id [ i ]                                               5    u(3)
    if(layer_dependency_info_present_flag[i]) {
        num_directly_dependent_layers[ i ]                         5    ue(v)
        for( j = 0; j < num_directly_dependent_layers[ i ];
            j++ )
            directly_dependent_layer_id_delta[ i ][ j ]            5    ue(v)
    }
    if( init_parameter_sets_info_present_flag[ i ] ) {
        num_init_seq_parameter_set_minus1[ i ]                     5    ue(v)
        for( j = 0; j <= num_seq_parameter_set_minus1[ i ];
            j++ )
            init_seq_parameter_set_id_delta[ i ][ j ]              5    ue(v)
        num_init_pic_parameter_set_minus1[ i ]                     5    ue(v)
        for( j = 0; j <= num_pic_parameter_set_minus1[ i ];
            j++ )
            init_pic_parameter_set_id_delta[i ][ j ]               5    ue(v)
    }
  }
}
```

Corresponding changes are also made to the semantic interpretation of the SSEI message syntax elements (Section F.10.2.1, Scalability information SEI message semantics, of the SVC JD5 specification). Specifically, the IDR access unit placement restriction is removed. Furthermore, when present, the SSEI message will take effect for all NAL units that follow and replace any and all previous scalability information effective for the current stream. The semantics of the message are valid until the next SEI message of the type scalability_info, scalability_info_add, scalability_info_replace, or scalability_info_del. The semantics of the nal_unit_extension_flag[i] are that a value equal to 0 specifies that the mapping of dependency_id[ i ], temporal_level[ i ], and quality_id[ i ] to simple_priority_id[i] for the layer layer_id[i] is included in this scalability information SEI message. nal_unit_extension_flag equal to 1 specifies that the simple_priority_id[i] parameter is not present. When nal_unit_extension_flag is not present, it is inferred to be equal to 1. The NAL unit syntax element extension_flag of all NAL units with nal_unit_type equal to 20 and 21 that follow this scalability information SEI message shall be equal to nal_unit_extension_flag. When profile_idc is not equal to 83

(identifying SVC), the syntax element extension_flag of all NAL units with nal_unit_type equal to 20 and 21 that reference the current sequence parameter set shall be equal to 1. Furthermore, the value of nal_unit_extension_flag is not allowed to be different in any subsequent scalability_info_add or scalability_info_replace messages, unless first modified by a scalability_info message. The semantics of avc_compatible_flag[i] are that a value equal to 1 specifies that the layer layer_id[i] conforms to the AVC specification. When avc_compatible_flag[i] is equal to 0, the current layer conforms to the SVC specification. When avc_compatible_flag[i] is equal to 1, the NAL unit header does not carry the extended header information. When avc_compatible_flag is equal to 1, then the values of dependency_id[i], temporal_level[i], and quality_level[i] for the current layer i are all assumed to be 0. The semantics of the priority_id[i] are that it specifies the simple_priority_id value to be used in the inferring process for the syntax elements dependency_id, temporal_level, and quality_level (as specified in Section F.7.4.1 of the SVC JD5 specification). For all values of priority_id[i], for which dependency_id[i], temporal_level [i], and quality_level_list[i] are not present, dependency_id[i], temporal_level[i], and quality_level[i] shall be inferred to be equal to 0. Finally, temporal_level[i], dependency_id[i] and quality_level[i] are equal to temporal_level, dependency_id and quality_level, respectively, of the NAL units in the scalable layer with layer identifier equal to i. If temporal_level[i], dependency_id[i], and quality_level[i] are not present, they are assumed to be 0.

The syntax of the new SEI 'scalability_info_add' message is identical to the 'scalability_info' SEI message. In terms of its semantics, when present, this SEI message will take effect for all NAL units that follow. It adds a number of layers to the scalability information currently effective. If the layer_id of a layer described in this message is already present in the scalability information maintained at the receiver, then the entire information for that layer is deleted and the information contained in this message is used in its place. The scalability information state effective after the application of this message remains valid until the next SEI message of the type scalability_info, scalability_info_add, scalability_info_replace, or scalability_info_del. The semantics of all fields are identical to scalability_info.

The syntax of the new SEI 'scalability_info_replace' message is identical to the 'scalability_info' SEI message. In terms of its semantics, when present, this SEI message will take effect for all NAL units that follow. It replaces the information for a number of layers, as specified by their layer_id, in the scalability information currently effective. Only the information contained in the message is replaced; any prior settings that are not modified by a given message remain in effect unmodified. The scalability information state effective after the application of this message remains valid until the next SEI message of the type scalability_info, scalability_info_add, scalability_info_replace, or scalability_info_del. The semantics of all fields are identical to scalability_info.

TABLE IV shows exemplary syntax for the new 'scalability_info_del' SEI message, in accordance with the principles of the present invention. As shown in the table, the message consists of a list of the layer id's of the layers that are to be considered removed from the bitstream. When present, this SEI message will take effect for all NAL units that follow. It deletes the information for a number of layers, as specified by their layer_id, in the scalability information currently effective. The scalability information state effective after the application of this message remains valid until the next SEI message of the type scalability_info, scalability_info_add, scalability_info_replace, or scalability_info_del. The semantics of all fields are identical to the corresponding ones in scalability_info.

TABLE IV

SCALABILITY INFORMATION DELETE SEI MESSAGE SYNTAX

| scalability_info_del( payloadSize ) { | C | Descriptor |
|---|---|---|
| num_layers_minus1 | 5 | ue(v) |
| for( i = 0; i <= num_layers_minus1; i++ ) { | | |
| layer_id[ i ] | 5 | u(8) |
| } | | |
| } | | |

Figure 2:
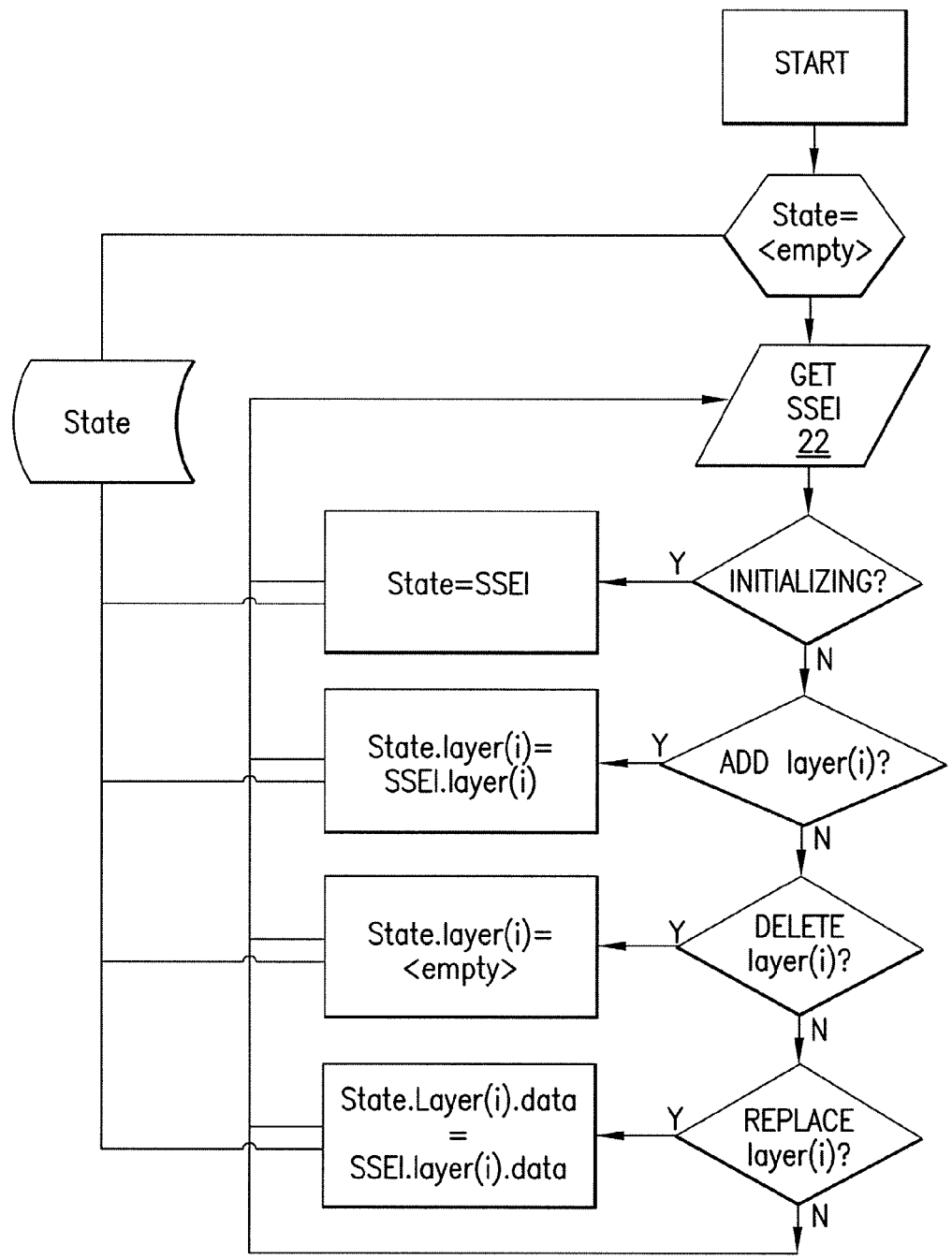
FIG. 2 is a flow diagram of the scalability information state management process, in accordance with the principles of the present invention.

FIG. 2 shows a flow diagram of an exemplary state processing algorithm 200 in embodiment A. The initial layer structure state (State) of the receiver is empty. At step 22, the receiver obtains Scalability Information SEI messages, either from the bitstream or through alternate means such as signaling. An obtained scalability_info SEI message can act as an initializing SSEI message and serves to initialize the State. Similarly obtained 'add', 'delete', and 'replace' scalability info SEI messages can add to, remove from, or modify, respectively, the current State for one or more layers. It is noted that multiple layers may be affected by each of these messages. However, for clarity the diagram in FIG. 2 shows the effect on a single layer (layer(i)).

In some communication systems or communication scenarios, the communication of the SSEI information message may never be inband with video data, but always communicated during session establishment, or through other reliable communication means. As video data may be transported over channels with non-zero packet loss rates, it may be desirable to ensure that such critical information is not subject to the possibility of loss.

For such communication systems or communication scenarios, in alternative embodiment B of the presentation invention, the Scalability Information may be established by a scalability_info SEI message, either offered during SDP negotiation or present in a in IDR access unit (e.g., in a file format). The information in such a scalability_info SEI message establishes the Scalability Information until the end of the sequence, or until another scalability_info SEI message is received, or re-negotiated in the case of SDP. The Scalability Information is not allowed to change during that time except from internal dependencies between layers. A further difference in embodiment B with respect to the embodiment A relates to the way state management is handled. In the embodiment A state changes are applied in a cumulative fashion, which has the drawback that the loss of a single message could corrupt the state information. In the alternative embodiment B, state changes are always applied with respect to the most recent scalability_info SEI message, and loss effects are not compounded.

In embodiment B, the 'add' SSEI message is not used, whereas the 'delete' SSEI message is renamed 'layers_notpresent.' A 'layers_notpresent' SSEI message indicates that a particular layer, and all dependent layers, will not be present in the bitstream starting from the access unit in which the SEI message is contained. The indication of which layers are not present is always performed with respect to the currently active scalability_info SEI message. It is noted that a convenient mechanism to indicate that a particular layer has been added after it has been removed is to transmit a 'layers_notpresent' message that removes all currently absent layers except the particular layer that is added. As an illustrative example, assume a bit stream that has 3 layers, numbered 0, 1, and 2. Further assume that after initially transmitting all 3 layers, a media server transmits a 'layers_notpresent' message indicating that layers 1 and 2 are not present. In this case, layer 1 can be added at a later time by transmitting a 'layers_notpresent' message which indicates that only layer 2 is not present. This, in effect, indicates that layer 1 has been added. The media server (or media gateway) can start transmitting the layer 1 information immediately after transmitting this 'layers_notpresent' SEI message.

In embodiment B, the 'replace' SSEI message of the first embodiment is changed to 'dependency_change' message. A scalability information dependency change SEI message indicates that the layer dependency for a particular layer_id has changed, and provides the new layer dependency information. The syntax for the dependency change SSEI message allows no other change in the information associated with the scalability information.

TABLE V shows exemplary syntax for the alternate new SEI payload types scalability_info_layers_notpresent (nr. 26) and scalability_info_dependency_change (nr. 27), replacing the syntax in Section D.1 of the SVC JD5 specification. In contrast to embodiment A, in embodiment B the Scalability Information SEI message is allowed to be present only at an IDR picture. The semantics of the message, with the exception of the layer dependency information, are valid until the next SEI message of the same type.

TABLE V

ALTERNATE SEI PAYLOAD TYPES

| sei_payload( payloadType, payloadSize ) { | C | Descriptor |
|---|---|---|
| if( payloadType == 0 ) | | |
|   Buffering_period( payloadSize ) | 5 | |
| else if( payloadType == 1 ) | | |
|   etc. | 5 | |
| else if( payloadType == 22 ) | | |
|   scalabilty_info( payloadSize) | 5 | |
|   /* specified in Annex F */ | | |
|   etc. | | |
| else if (payloadType == 26) | | |
|   scalability_info_layers_notpresent(payloadSize) | 5 | |
|   /* specified in Annex F */ | | |
| else if (payloadType == 27) | | |
|   scalability_info_dependency_change(payloadSize) | 5 | |
| /* specified in Annex F */ | | |
| else | | |
|   reserved_sei_message( payloadSize ) | 5 | |
| if( !byte_aligned( ) ) { | | |
|   bit_equal_to_one /* equal to 1 */ | 5 | f(1) |
|   while( !byte_aligned( ) ) | | |
|     bit_equal_to_zero /* equal to 0 */ | 5 | f(1) |
|   } | | |
| } | | |

Specific layers can be indicated as inactive (no longer present in the bitstream) with the scalability_info_layers_notpresent SEI message. Exemplary syntax for this message is shown in TABLE VI.

TABLE VI

SCALABILITY INFORMATION LAYERS-NOT-PRESENT SEI MESSAGE

| scalability_info_layers_notpresent( payloadSize ) { | C | Descriptor |
|---|---|---|
| num_layers | 5 | ue(v) |
| for( I = 0; i < num_layers; i++ ) { | | |
|   layer_id[ i ] | 5 | u(8) |
| } | | |
| } | | |

When present, this SEI message will take effect for all NAL units that follow. The message indicates that the specified layers, as identified by their layer_id, will not be present in the bitstream. The scalability information state effective after the application of this message remains valid until the next SEI message of the type scalability_info or scalability_info_layers_notpresent. The num_layers indicates the number of scalable layers or presentation points that will not be present in the bitstream after decoding of this SEI message. The value of num_layers is in the scope of 0 to 255, inclusive. When num_layers has the value 0 it indicates that all layers are present. The layer_id[i] indicates the identifier of the scalable layer that is indicated as not present in the bitstream. The message simply contains a list of the layers that are identified as not present.

TABLE VII shows exemplary syntax for the scalability_info_dependency_change SEI message. When present, this SEI message will take effect for all NAL units that follow. Layer dependency information for a particular layer consists of the information resulting from the decoding of the syntax elements num_directly_dependent_layer, directly_dependent_layer_id_delta_minus1, or alternatively the new syntax element layer_dependency_info_src_layer_id_delta_minus1. This new element allows the system to identify he layer id of another layer that has identical layer dependency information to the present layer (by encoding the layer id difference minus 1).

TABLE VII

SCALABILITY INFORMATION DEPENDENCY CHANGE SEI MESSAGE

| scalability_info_dependency_change ( payloadSize ) { | C | Descriptor |
|---|---|---|
| num_layers_minus1 | 5 | ue(v) |
| for( i = 0; i <= num_layers_minus1; i++ ) { | | |
|   layer_id[ i ] | 5 | u(8) |
|   layer_dependency_info_present_flag[i] | 5 | u(1) |
|   if (layer_dependency_info_present_flag[ i ]) { | | |
|     num_directly_dependent_layers[ i ] | 5 | ue(v) |
|     for ( j = 0; j < num_directly_dependent_layers[ i ]; j++ ) | | |
|       directly_dependent_layer_id_delta_minus1[ i ][ j ] | 5 | ue(v) |
|   } else { | | |
|     layer_dependency_info_src_layer_id_delta_minus1 [ i ] | 5 | ue(v) |
|   } | | |
| } | | |
| } | | |

The scalability_info_dependency_change SEI message indicates that the layer dependency information for the specified layers, as identified by their layer_id, will change as specified by the contents of this message. The scalability information state effective after the application of this message remains valid until the next SEI message of the type scalability_info or scalability_info_dependency_change.

num_layers_minus1 plus 1 indicates the number of scalable layers or presentation points for which the layer dependency information will change after decoding of this SEI message. The value of num_layers_minus1 is in the scope of 0 to 255, inclusive.

The layer_id[i] indicates the identifier of the scalable layer for which the layer dependency information will change.

The layer_dependency_info_present_flag[i] equal to 1 indicates the presence of the layer dependency information for the scalable layer with layer identifier equal to layer_id[i] in the SEI message. A value 0 indicates that the layer dependency information for the scalable layer with layer identifier equal to i is not present in the SEI message, and is the same as another layer indicated by layer_dependency_info_src_layer_id_delta_minus1[i].

num_directly_dependent_layers[i] indicates the number of scalable layers that the scalable layer with layer identifier equal to layer_id[i] is directly dependent on. For example, layer M is directly dependent on layer Q if there is at least one coded picture in layer M that uses inter-layer prediction from layer Q. The value of num_directly_dependent_layers is in the scope of 0 to 255, inclusive.

directly_dependent_layer_id_delta_minus1[i][j] indicates the difference between layer_id[i] and the layer identifier of the jth scalable layer that the scalable layer with layer identifier equal to layer_id[i] is directly dependent on and i. The layer identifier of the directly dependent scalable layer is equal to (layer_id[i]—directly_dependent_layer_id_delta_minus1—1).

layer_dependency_info_src_layer_id_delta_minus1[i] specifies that the layer with layer identifier equal to layer_id[i] has the same layer dependency information as the layer with layer identifier equal to (layer_id[i]—layer_dependency_info_src_layer_id_delta_minus1[i]—1).

Figure 3:
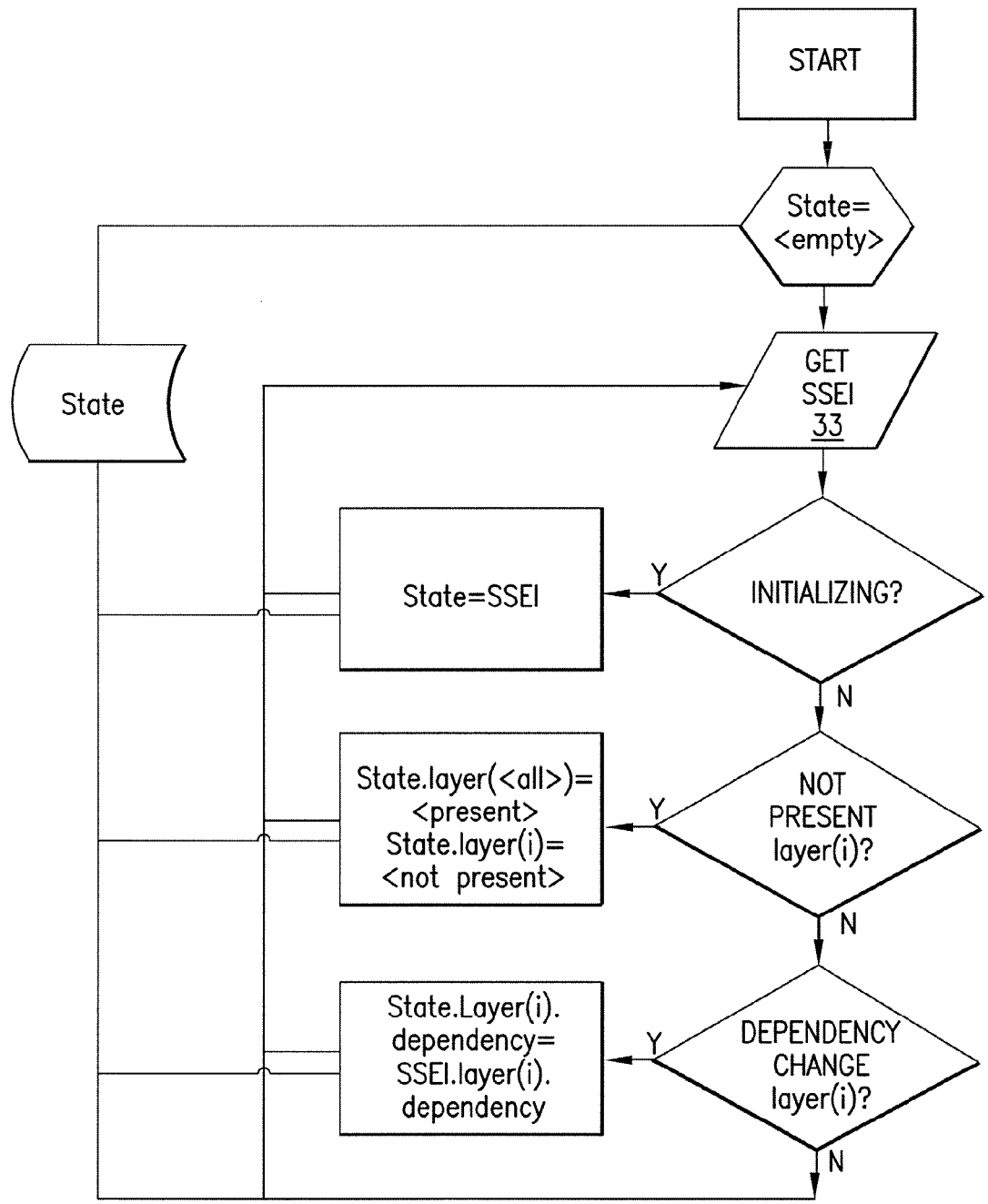
FIG. 3 is a flow diagram of the scalability information state management process for an alternative embodiment, in accordance with the principles of the present invention.

FIG. 3 shows a flow diagram of an exemplary state processing algorithm 300 in embodiment B. The initial layer structure state (State) of the receiver is empty. At step 33, the receiver obtains Scalability Information SEI messages, either from the bitstream or through alternate means such as signaling. A scalability_info SEI message acts as an initializing SSEI message and it serves to initialize the state. The 'layers_notpresent' and 'dependency_change' messages mark one or more layer as not present, or modify their decoding dependency information, respectively. It is noted that in this alternative embodiment B, layers are neither added nor removed by the non-initializing messages. This ensures state consistency (with the possible exception of decoding dependency), as long as the initializing messages are reliably received. It is noted that multiple layers may be affected by each of these messages. However, for clarity the diagram in FIG. 3 like the diagram in FIG. 2 shows the effect on a single layer (layer(i)).

Although the preferred embodiments described herein use the H.264 SVC standard, it will be obvious to persons skilled in the art that the techniques described herein can be directly applied or extended to any coding structure that allows multiple spatial/quality, and temporal levels, either for video or for audio, or any other multimedia data.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

It also will be understood that the systems and methods of the present invention can be implemented using any suitable combination of hardware and software. The software (i.e., instructions) for implementing and operating the aforementioned systems and methods can be provided on computer-readable media, which can include without limitation, firmware, memory, storage devices, microcontrollers, microprocessors, integrated circuits, ASICS, on-line downloadable media, and other available media.

The invention claimed is:

1. A digital media communication system comprising:
a media server that transmits media encoded in a scalable media coding format;
at least one receiver; and
an electronic communication network linking the transmitting media server and the at least one receiver,
wherein the media server is configured to transmit to the at least one receiver scalability information pertaining to the transmitted media including initializing scalability information and changes to the scalability information with time, and wherein the transmitted changes to the scalability information are encoded in a differential form and the changes to the scalability information indicate that at least one of:
 a scalability layer is added to the bitstream from that time forward,
 a scalability layer is removed from the bitstream from that time forward, or
 the scalability information for at least one layer present in the bitstream is replaced with
 the scalability information contained in a Supplemental Enhancement Information (SEI) message that contains the changes to the scalability information from that time forward, and
wherein any scalability information for a layer which is not explicitly coded in the changes to the scalability information is assumed to retain the scalability information's previous value.

2. The system of claim 1, wherein the scalable media coding format is H.264 Scalable Video Coding (SVC), the initializing scalability infounation is the SVC scalability_info Supplemental Enhancement Information (SEI) message, and wherein the transmitted changes to the scalability information are applied cumulatively at the receiver.

3. The system of claim 2, wherein the changes to the scalability information further include a scalability_info_add SEI message indicating that at least one scalability layer is added to the bitstream from that time forward.

4. The system of claim 2, wherein the changes to the scalability information further include a scalability_info_replace SEI message indicating that the scalability information for at least one layer present in the bitstream is replaced with the scalability information contained in the said scalability_info_replace SEI message from that time forward, and wherein any scalability information for a layer which is not explicitly coded in the scalability_info_replace SEI message is assumed to retain the scalability information's previous value.

5. The system of claim 2, wherein the changes to the scalability information further include a scalability_info_del SEI message indicating that at least one layer is removed from the bitstream from that time forward.

6. The system of claim 2, wherein the changes to the scalability information appear in any access unit of the coded video signal.

7. The system of claim 2, wherein the receiver is a media gateway.

8. The system of claim 1, wherein the scalable media coding format is H.264 SVC, the initializing scalability information is the SVC scalability_info SEI message, and wherein the changes to the scalability information are applied at the receiver individually using the most recent scalability_info SEI message as a reference.

9. The system of claim 8, wherein the changes to the scalability information further include a scalability_info_layers_notpresent SEI message indicating that at least one scalability layer indicated in the initializing scalability information is not present in the bitstream from that time forward.

10. The system of claim 8, wherein the changes to the scalability information further include a scalability_info_dependency_change SEI message indicating that the layer dependency information for at least one layer indicated in the most recent initializing scalability information is replaced with the layer dependency information contained in the said scalability_*info*_dependency_change SEI message from that time forward.

11. The system of claim 8, wherein the changes to the scalability infoimation appear in any access unit of the coded video signal.

12. The system of claim 8, wherein the receiver is a media gateway.

13. A system comprising:
a digital media decoding device configured to process coded media data, the coded media data comprising:
scalably coded media data;
initializing scalability information data; and
changes to initializing scalability information data with time,
wherein the scalability information data is used to inform the decoding device about the presence and dependency structure of the layers contained in the coded media data, and wherein the changes to initializing scalability information data are encoded in a differential form and the changes to the scalability information indicate that at least one of:
a scalability layer is added to the bitstream from that time forward,
a scalability layer is removed from the bitstream from that time forward, or
the scalability information for at least one layer present in the bitstream is replaced with the scalability information contained in a Supplemental Enhancement Information (SEI) message that contains the changes to the scalability information from that time forward, and
wherein any scalability information for a layer which is not explicitly coded in the changes to the scalability information is assumed to retain the scalability information's previous value.

14. The system of claim 13, wherein the scalable media data is coded according to H.264 Scalable Video Coding (SVC), the initializing scalability information is the SVC scalability_info Supplemental Enhancement Information (SEI) message, and wherein the changes to the scalability information are applied at the decoding device cumulatively.

15. The system of claim 14, wherein the changes to the scalability information further include a scalability_info_add SEI message indicating that at least one scalability layer is added to the bitstream from that time forward.

16. The system of claim 14, wherein the changes to the scalability information further include a scalability_info_replace SEI message indicating that the scalability information for at least one layer present in the bitstream is replaced with the scalability information contained in the said scalability_info_replace SEI from that time forward, and wherein any scalability information for a layer which is not explicitly coded in the scalability_info_replace SEI message is assumed to retain the scalability information's previous value.

17. The system of claim 14, wherein the changes to the scalability information further include a scalability_info_del SEI message indicating that at least one layer is removed from the bitstream from that time forward.

18. The system of claim 14, wherein the changes to the scalability information may appear in any access unit of the coded video signal.

19. The system of claim 13, wherein the scalable media data is coded according to H.264 SVC, the initializing scalability information is the SVC scalability_info SEI message, and wherein the changes to the scalability information are applied at the decoding device individually using the most recent scalability_info SEI message as a reference.

20. The system of claim 19, wherein the changes to the scalability information further include a scalability_info_layers_notpresent SEI message indicating that one or more of the scalability layers indicated in the initializing scalability information are not present in the bitstream from that time forward.

21. The system of claim 19, wherein the changes to the scalability information further include a scalability_info_dependency_change SEI message indicating that the layer dependency information for at least one layer indicated in the most recent initializing scalability information is replaced with the layer dependency information contained in the said scalability_info_dependency_change SEI message from that time forward.

22. The system of claim 19, wherein the changes to the scalability information may appear in any access unit of the coded video signal.

23. A method for digital media communication over an electronic communication network linking at least one receiver to a transmitting media server which transmits media encoded in a scalable media coding format, the method comprising:
transmitting from the media server to the at least one receiver scalability information pertaining to the transmitted media including initializing scalability information and changes to the scalability information with time,
wherein the transmitted changes to the scalability information are encoded in a differential form and the changes to the scalability information indicate that at least one of:
a scalability layer is added to the bitstream from that time forward,
a scalability layer is removed from the bitstream from that time forward, or
the scalability information for at least one layer present in the bitstream is replaced with the scalability information contained in a Supplemental Enhancement Information (SEI) message that contains the changes to the scalability information from that time forward, and
wherein any scalability information for a layer which is not explicitly coded in the changes to the scalability information is assumed to retain the scalability information's previous value.

24. The method of claim 23, wherein the scalable media coding format is H.264 Scalable Video Coding (SVC), the initializing scalability information is the SVC scalability_info Supplemental Enhancement Information (SEI) message, the method further comprising:
applying the transmitted changes to the scalability information cumulatively at the receiver.

25. The method of claim 24, further comprising including in the changes to the scalability information a scalability_info_add SEI message indicating that at least one scalability layer is added to the bitstream from that time forward.

26. The method of claim 24, further comprising including in the changes to the scalability information a scalability_info_replace SEI message indicating that the scalability information for at least one layer present in the bitstream is replaced with the scalability information contained in the said scalability_info_replace SEI message from that time forward,
wherein any scalability information for a layer which is not explicitly coded in the scalability_info_replace SEI message is assumed to retain the scalability information's previous value.

27. The method of claim 24, further comprising including in the changes to the scalability information a scalability_info_del SEI message indicating that at least one layer is removed from the bitstream from that time forward.

28. The method of claim 24, wherein the changes to the scalability information appear in any access unit of the coded video signal.

29. The method of claim 24, wherein the receiver is a media gateway.

30. The method of claim 23, wherein the scalable media coding format is H.264 SVC, the initializing scalability information is the SVC scalability_info SEI message, the method further comprising applying the changes to the scalability information at the receiver individually using the most recent scalability_info SEI message as a reference.

31. The method of claim 30, further comprising including in the changes to the scalability information a scalability_info_layers_notpresent SEI message indicating that at least one scalability layer indicated in the initializing scalability information is not present in the bitstream from that time forward.

32. The method of claim 30, further comprising including in the changes to the scalability information a scalability_info _dependency_change SEI message indicating that the layer dependency information for at least one layer indicated in the most recent initializing scalability information is replaced with the layer dependency information contained in the said scalability_info_dependency_change SEI message from that time forward.

33. The method of claim 30, wherein the changes to the scalability information appear in any access unit of the coded video signal.

34. The method of claim 30, wherein the receiver is a media gateway.

35. A method for decoding digital media, wherein the digital media includes scalably coded media data and scalability information data including initializing scalability information data and changes to initializing scalability information data with time encoded in a differential form, the method comprising:
   at a decoder, using the scalability information data to inform the decoder about the presence and dependency structure of the layers contained in the coded media data, wherein the changes to initializing scalability information data indicates that at least one of:
      a scalability layer is added to the bitstream from that time forward,
      a scalability layer is removed from the bitstream from that time forward, or
      the scalability information for at least one layer present in the bitstream is replaced with the scalability information contained in a Supplemental Enhancement Information (SEI) message that contains the changes to initializing scalability information data from that time forward, and
   wherein any scalability information data for a layer which is not explicitly coded in the changes to initializing scalability information data is assumed to retain the scalability information data's previous value.

36. The method of claim 35, wherein the scalable media data is coded according to H.264 Scalable Video Coding (SVC), the initializing scalability information is the SVC scalability_info Supplemental Enhancement Information (SEI) message, the method further comprising applying the changes to the scalability information at the decoder cumulatively.

37. The method of claim 36, wherein the changes to the scalability information further include a scalability_info_add SEI message indicating that at least one scalability layer is added to the bitstream from that time forward.

38. The method of claim 36, wherein the changes to the scalability information further include a scalability_info_replace SEI message indicating that the scalability information for at least one layer present in the bitstream is replaced with the scalability information contained in the said scalability_info_replace SEI from that time forward, the method further comprising:
   assuming that any scalability information for a layer which is not explicitly coded in the scalability_info_replace SEI message retains the scalability information's previous value.

39. The method of claim 36, wherein the changes to the scalability information further include
   a scalability_info_del SEI message indicating that at least one layer is removed from the bitstream from that time forward.

40. The method of claim 36, wherein the changes to the scalability information may appear in any access unit of the coded video signal.

41. The method of claim 35, wherein the scalable media data is coded according to H.264 SVC, and the initializing scalability information is the SVC scalability _info SEI message, the method further comprising:
   applying the changes to the scalability information at the decoder individually and using the most recent scalability_info SEI message as a reference.

42. The method of claim 41, wherein the changes to the scalability information further include a scalability_info_layers_notpresent SEI message indicating that one or more of the scalability layers indicated in the initializing scalability information are not present in the bitstream from that time forward.

43. The method of claim 41, wherein the changes to the scalability information further include a scalability_info _dependency_change SEI message indicating that the layer dependency information for at least one layer indicated in the most recent initializing scalability information is replaced with the layer dependency information contained in the said scalability_info _dependency_change SEI message from that time forward.

44. The method of claim 41, wherein the changes to the scalability information may appear in any access unit of the coded video signal.

45. A non-transitory computer readable medium comprising an executable set of instructions to direct a processor to:
   transmit from a media server to at least one receiver scalability information pertaining to transmitted media including initializing scalability information and changes to the scalability information with time,
wherein an electronic communication network links the at least one receiver to the transmitting media server which transmits media encoded in a scalable media coding format, wherein the transmitted changes to the scalability information are encoded in a differential form and the changes to the scalability information indicate that at least one of:
   a scalability layer is added to the bitstream from that time forward,
   a scalability layer is removed from the bitstream from that time forward, or
   the scalability information for at least one layer present in the bitstream is replaced with the scalability information contained in a Supplemental Enhancement Information (SEI) message that contains the changes to the scalability information from that time forward, and wherein any scalability information for a layer which is not explicitly coded in the changes to the scalability information is assumed to retain the scalability information's previous value.

46. The non-transitory computer readable medium of claim 45, wherein the scalable media coding format is H.264 Scalable Video Coding (SVC), the initializing scalability information is the SVC scalability_info Supplemental Enhancement Information (SEI) message, further comprising executable instructions to direct the processor to:
  apply the transmitted changes to the scalability information cumulatively at the receiver.

47. The non-transitory computer readable medium of claim 46, further comprising executable instructions to direct the processor to include in the changes to the scalability information a scalability_info_add SEI message indicating that at least one scalability layer is added to the bitstream from that time forward.

48. The non-transitory computer readable medium of claim 46, further comprising executable instructions to direct the processor to include in the changes to the scalability information a scalability_info_replace SEI message indicating that the scalability information for at least one layer present in the bitstream is replaced with the scalability information contained in the said scalability_info_replace SEI message from that time forward,
  wherein any scalability information for a layer which is not explicitly coded in the scalability_info_replace SEI message is assumed to retain the scalability information's previous value.

49. The non-transitory computer readable medium of claim 46, further comprising executable instructions to direct the processor to include in the changes to the scalability information a scalability_info_del SEI message indicating that at least one layer is removed from the bitstream from that time forward.

50. The non-transitory computer readable medium of claim 46, wherein the changes to the scalability information appear in any access unit of the coded video signal.

51. The non-transitory computer readable medium of claim 46, wherein the receiver is a media gateway.

52. The non-transitory computer readable medium of claim 45, wherein the scalable media coding format is H.264 SVC, the initializing scalability information is the SVC scalability_info SEI message, further comprising executable instructions to direct the processor to apply the changes to the scalability information at the receiver individually using the most recent scalability_info SEI message as a reference.

53. The non-transitory computer readable medium of claim 52, further comprising executable instructions to direct the processor to include in the changes to the scalability information a scalability_info_layers_notpresent SEI message indicating that at least one scalability layer indicated in the initializing scalability information is not present in the bitstream from that time forward.

54. The non-transitory computer readable medium of claim 52, further comprising executable instructions to direct the processor to include in the changes to the scalability information a scalability_info_dependency_change SEI message indicating that the layer dependency information for at least one layer indicated in the most recent initializing scalability information is replaced with the layer dependency information contained in the said scalability_info_dependency_change SEI message from that time forward.

55. The non-transitory computer readable medium of claim 52, wherein the changes to the scalability information appear in any access unit of the coded video signal.

56. The non-transitory computer readable medium of claim 52, wherein the receiver is a media gateway.

57. A non-transitory computer readable medium comprising an executable set of instructions to direct a processor to:
  use scalability information data to inform a decoder about a presence and a dependency structure of layers contained in coded digital media data,
wherein the coded digital media data includes scalably coded media data and the scalability information data, which includes initializing scalability information data and changes to initializing scalability information data with time encoded in a differential form,
wherein the changes to initializing scalability information data indicates that at least one of:
  a scalability layer is added to the bitstream from that time forward,
  a scalability layer is removed from the bitstream from that time forward, or
  the scalability information for at least one layer present in the bitstream is replaced with the scalability information contained in a Supplemental Enhancement Information (SEI) message that contains the changes to initializing scalability information data from that time forward, and
wherein any scalability information data for a layer which is not explicitly coded in the changes to initializing scalability information data is assumed to retain the scalability information data's previous value.

58. The non-transitory computer readable medium of claim 57, wherein the scalable media data is coded according to H.264 Scalable Video Coding (SVC), the initializing scalability information is the SVC scalability_info Supplemental Enhancement Information (SEI) message, further comprising executable instructions to direct the processor to apply the changes to the scalability information at the decoder cumulatively.

59. The non-transitory computer readable medium of claim 58, wherein the changes to the scalability information further include a scalability_info_add SEI message indicating that at least one scalability layer is added to the bitstream from that time forward.

60. The non-transitory computer readable medium of claim 58, wherein the changes to the scalability information further include a scalability_info_replace SEI message indicating that the scalability information for at least one layer present in the bitstream is replaced with the scalability information contained in the said scalability_info_replace SEI from that time forward,
  further comprising executable instructions to direct the processor to:
    assume that any scalability information for a layer which is not explicitly coded in the scalability_info_replace SEI message retains the scalability information's previous value.

61. The non-transitory computer readable medium of claim 58, wherein the changes to the scalability information further include
  a scalability_info_del SEI message indicating that at least one layer is removed from the bitstream from that time forward.

62. The non-transitory computer readable medium of claim 58, wherein the changes to the scalability information may appear in any access unit of the coded video signal.

63. The non-transitory computer readable medium of claim 57, wherein the scalable media data is coded according to H.264 SVC, and the initializing scalability information is the SVC scalability_info SEI message, further comprising executable instructions to direct the processor to:

applying the changes to the scalability information at the decoder individually and using the most recent scalability_info SEI message as a reference.

64. The non-transitory computer readable medium of claim 63, wherein the changes to the scalability information further include a scalability_info_layers_notpresent SEI message indicating that one or more of the scalability layers indicated in the initializing scalability information are not present in the bitstream from that time forward.

65. The non-transitory computer readable medium of claim 63, wherein the changes to the scalability information further include a scalability_info_dependency_change SEI message indicating that the layer dependency information for at least one layer indicated in the most recent initializing scalability information is replaced with the layer dependency information contained in the said scalability_info_dependency_change SEI message from that time forward.

66. The non-transitory computer readable medium of claim 63, wherein the changes to the scalability information may appear in any access unit of the coded video signal.

* * * * *

UNITED STATES PATENT AND TRADEMARK OFFICE
CERTIFICATE OF CORRECTION

Page 1 of 1

PATENT NO. : 8,761,263 B2
APPLICATION NO. : 11/691621
DATED : June 24, 2014
INVENTOR(S) : Alexandros Eleftheriadis It is certified that error appears in the above-identified patent and that said Letters Patent is hereby corrected as shown below:

ON THE TITLE PAGE
Under the heading: "Related U.S. Application Data"
At item (63), line 14

WHERE IT INCORRECTLY READS:

"PCT/US2006/062357, filed on Dec. 20, 2006, and a continuation-in-part of application No. PCT/US2006/063335, filed on Mar. 5, 2007."

IT SHOULD INSTEAD READ AS FOLLOWS:

-- PCT/US2007/062357, filed on Feb. 16, 2007, and a continuation-in-part of application No. PCT/US2007/063335, filed on Mar. 5, 2007 --

Signed and Sealed this
Sixteenth Day of September, 2014

Michelle K. Lee
*Deputy Director of the United States Patent and Trademark Office*